Patented Jan. 13, 1931

1,789,204

UNITED STATES PATENT OFFICE

WILLARD L. VOGEL, OF LOS ANGELES, CALIFORNIA, ASSIGNOR OF ONE-TENTH TO PAUL W. PRUTZMAN

ALKALI-METAL SALTS OF MERCURI-BROM-FLUORESCEIN

No Drawing. Original application filed May 28, 1928, Serial No. 281,355. Divided and this application filed September 24, 1929. Serial No. 394,927.

The object of my invention is to produce a heretofore unknown mono-brom derivative of fluorescein and a heretofore unknown mercuric derivative of the said mono-brom compound. This mercury derivative may in turn be converted into a tetra-salt of an alkali metal, the tetra-sodium salt in particular having highly valuable properties as an antiseptic and therapeutic agent.

My invention comprises three steps: The bromination of fluorescein under such conditions as to produce the mono-brom derivative instead of the di-brom or tetra-brom derivatives heretofore known; the conversion of the mono-brom compound into a di-mercury derivative, and the conversion of the mercury derivative into a salt of an alkali metal.

The first step is taken in the following manner. To one molecule or 332 parts by weight of fluorescein I add approximately 660 parts of glacial acetic acid bring the fluorescein into even suspension and add gradually one molecule or 160 parts by weight of bromin ($Br_2$). Copious fumes of hydrobromic acid are given off and agitation is continued at normal temperature until these fumes cease. The mixture is now allowed to stand for a short time, or until a pasty yellow cake is formed. This operation must be conducted in glass or equivalent vessel.

I next add to the cake about 1,000 parts by weight of water and stir until the cake is broken up, finally adding and intermixing an additional 3,200 parts of water. The thick yellow magma thus produced is then filtered by suction, washed with water, sucked as dry as possible, and finally transferred to a drying dish of porcelain or similar material, over the surface of which it is thinly distributed. The material is then heated on a sand or oil bath to a temperature not to exceed 105° C., the acetic acid which separates being poured off from time to time, and drying continued at the same temperature until a dry material which, when powdered, is free from the odor of acetic acid is formed.

The product of the above reaction is monobrom-fluorescein, $C_{20}H_{11}O_5Br$, a yellow powder, insoluble in water, melting at 110° C., and having a molecular weight of 411. The yield is approximately 1.1 times the weight of fluorescein taken. The reaction which takes place appears to be represented by the following structural formula, it being understood that I have not determined which one of the three possible positions in the resorcinol ring is occupied by the bromin.

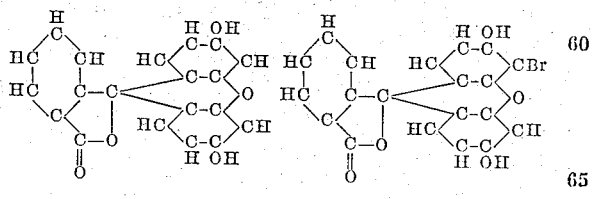

| Flourescein | M. W. 332 | Monobromflourescein | M. W. 411 |
| Bromin | M. W. 160 | Hydrobromic acid | M. W. 81 |

I then proceed to the second step in the following manner. I first dissolve and reprecipitate the bromo-compound by mixing 1⅛ molecules or 462 parts by weight in a glass vessel with 2¼ molecules or 90 parts by weight of sodium hydroxid dissolved in say 500 parts by weight of water. I then add with constant stirring 2¼ molecules or 135 parts by weight of glacial acetic acid, by which a yellow precipitate is formed.

In a separate vessel I prepare a solution of mercuric acetate by dissolving 2⅛ molecules or 460 parts by weight of red mercuric oxid (HgO) in 8 molecules or 480 parts by weight of glacial acetic acid diluted with 1,000 parts of water. Heat is applied until a clear solution is obtained, which is further diluted and filtered.

This solution is added to the reprecipitated bromo-compound and the mixture diluted with approximately an equal volume of water. This mixture is then boiled under a reflux condenser for from five to seven hours, or until a sample of filtrate fails to give a positive test for mercury with ammonium sulfid. At the completion of the reaction the precipitate is filtered out, repeatedly washed with water, dried at approximately 110° C., and ground to a fine powder.

The product of the above reaction is a dark red powder, insoluble in water, the empirical formula being $C_{20}H_9O_5Br(HgOH)_2$ and the molecular weight 810.2. The structure of this body and the reaction by which it is formed appear to be as follows:

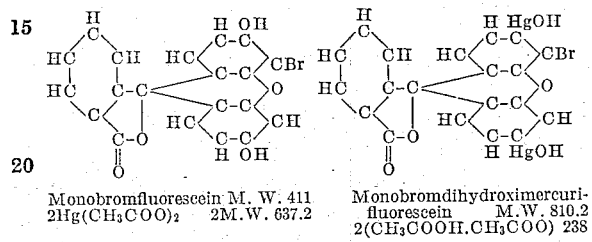

Monobromfluorescein M.W. 411
2Hg(CH₃COO)₂ 2M.W. 637.2

Monobromdihydroximercurifluorescein M.W. 810.2
2(CH₃COOH.CH₃COO) 238

The yield of the mercuriated product is approximately eighty percent of the quantity calculated from the addition of mercury to the bromo-compound.

The final step in my invention is the preparation of an alkali metal salt of the above mercuric compound. This is formed by direct addition, one molecule or 810 parts by weight of the mercuric compound and four molecules of a monatomic alkali (160 parts by weight if sodium hydroxid) are dissolved in 3600 parts of pure methyl alcohol and stirred with gentle heating. The solution is then evaporated slowly to dryness and the dry melt powdered and stored in absolutely dry glass bottles.

If the melt is noted to contain any red particles it is redissolved in water and again evaporated to dryness. It is desirable to use glass beads to prevent spattering and to evaporate at about 50° C., or at the lowest practicable temperature.

The tetra-sodium compound thus produced is a brassy green powder, slightly crystalline and highly hygroscopic. It is soluble in a small proportion of water, yielding a deep carmine red solution which on extreme dilution becomes a rich orange. The solution shows a strong green fluorescence and stains the skin bright red. The salt decomposes on heating has no definite melting point.

Chemically the sodium salt is tetrasodium-dihydroxymercuri - monobrom - fluorescein, empirical formula $C_{20}H_5O_5Br(HgOH)_2Na_4$, molecular weight 898.2. The position of the sodium atoms is not known with certainty, but as only the tetra salt is formed it is probable that they are symmetrical in the two resorcinol rings and that the structure is as indicated below.

The salts of the alkali metals, and in particular the sodium salt, are powerful and non-irritating local antiseptics and preventives of infection.

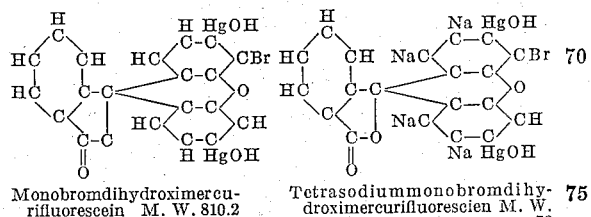

Monobromdihydroximercurifluorescein M.W. 810.2
4 NaOH 4 M.W. 160

Tetrasodiummonobromdihydroximercurifluorescien M.W. 898.2 4 H₂O 72

This is a division of my co-pending application entitled Mercury bromin derivatives of fluorescein, Serial No. 281,355, filed May 28, 1928, Patent Number 1,749,201.

I claim as my invention:

1. The herein described product: the tetrasodium salt of the dimercury derivative of monobromfluorescein.

2. The herein described product: tetrasodium-mono-brom-dihydroxi-mercuri-fluorescein, having the empirical formula $C_{20}H_5O_5BrNa_4(HgOH)_2$.

3. The herein described products, comprising: the alkali metal salts of the dimercury derivative of monobrom-fluorescein.

In witness that I claim the foregoing I have hereunto subscribed my name this 23rd day of August, 1929.

WILLARD L. VOGEL.